United States Patent [19]

Heller et al.

[11] 4,082,624

[45] Apr. 4, 1978

[54] ARTICLES ELECTRODEPOSITED WITH RUTHENIUM AND PROCESSES OF PRODUCING SUCH ARTICLES

[75] Inventors: Adam Heller, Bridgewater; Barry Miller, Murray Hill; Richard George Vadimsky, Somerville, all of N.J.

[73] Assignee: Bell Telephone Laboratories, Incorporated, Murray Hill, N.J.

[21] Appl. No.: 747,239

[22] Filed: Dec. 3, 1976

[51] Int. Cl.$^2$ .......................... C25D 3/50; C01B 9/02
[52] U.S. Cl. ....................................... 204/47; 423/463
[58] Field of Search ................ 204/47, 43 N; 423/463

[56] References Cited

U.S. PATENT DOCUMENTS

| | | | |
|---|---|---|---|
| 3,576,724 | 4/1971 | Reddy et al. | 204/47 |
| 3,625,840 | 12/1971 | Mason et al. | 204/47 |
| 3,793,162 | 2/1974 | Hope | 204/47 |

OTHER PUBLICATIONS

Research Disclosure, No. 112, p. 8, Aug. 1973.

*Primary Examiner*—G. L. Kaplan
*Attorney, Agent, or Firm*—George S. Indig; Richard D. Laumann

[57] ABSTRACT

The ruthenium compound $[Ru_2N(H_2O)_2Cl_8]K_3$ is prepared by refluxing a mixture of hydrated water soluble ruthenium chloride, having approximately 40% ruthenium content, and sulphamic acid, the latter having approximately half the molar concentration of the former, for several hours and then precipitating the desired compound by adding solutions of potassium chloride and hydrochloric acid. Electrical contacts on the reeds of sealed reed switches produced by electroplating from an aqueous solution of the salt produced in this manner are found to be particularly resistant to the thermal shock involved in the sealing of the switches.

11 Claims, No Drawings

ARTICLES ELECTRODEPOSITED WITH RUTHENIUM AND PROCESSES OF PRODUCING SUCH ARTICLES

BACKGROUND OF THE INVENTION

1. Field of the Invention

This invention relates generally to articles having an electrodeposited metallic layer and, more particularly, to articles having an electrodeposited layer of ruthenium and to processes of producing such articles.

2. Description of the Prior Art

A metallic layer is electrodeposited on many types of articles to improve either their esthetic or functional properties. In many applications, such as electrical contacts, a hard and wear resistant metallic layer greatly improves the functional properties of the article. Use of ruthenium in such applications is theoretically attractive because it is very hard and is relatively cheap. For example, plated ruthenium is potentially harder, more durable and cheaper than the plated gold commonly used on electrical contacts such as those on the magnetic reeds of sealed reed switches. In spite of these attractive qualities, ruthenium has not received widespread electroplating use because of difficulties encountered in plating moderately thick ruthenium layers that are not brittle or prone to crack when subjected to stresses such as those encountered in the sealing of the envelopes of sealed reed switches.

The plating solution that has appeared to yield the best quality ruthenium plating, while maintaining reasonable plating efficiencies, uses the ammonium, lithium, potassium or sodium salt of the nitrogen bridged anionic complex $[Ru_2N(H_2O)_2Cl_8]^{3-}$. Methods directed to preparing and using the complex for electroplating are described in U.S. Pat. No. 3,576,724. Other processes, such as described in U.S. Pat. Nos. 2,057,638 and 3,122,544, may produce this or a similar nitrogen bridged binuclear ruthenium complex. The preparatory method of U.S. Pat. No. 3,576,724 heats an aqueous solution of ruthenium chloride, in either solid hydrated form or in a hydrochloric acid solution, and excess sulphamic acid for a period of time, typically 48 hours, sufficient to hydrolyze the sulphamate. The ammonium salt is obtained from the resulting solution, for use either in a plating bath or as the starting material in a conventional ion exchange process yielding the potassium, lithium or sodium salt, by concentrating the solution, cooling to 0° C and filtering. According to U.S. Pat. No. 3,576,724, the amount of sulphamic acid should be between 4 and 9 molecular proportions of sulphamic acid for each atomic proportion of ruthenium. The preferred molar ratio of sulphamic acid to ruthenium is stated to be between 4 and 5 for the best yield. Hydrochloric acid may be added to the ruthenium chloride and sulphamic acid mixture, after completion of the initial reaction, to obtain the best yield of the desired ruthenium complex by preventing undesired groups, such as bisulphate groups, from entering the complex and replacing chlorine atoms.

A particular problem not satisfactorily overcome by prior art plating baths is oxidation of ruthenium at the anode to states higher than the +4 state in the ruthenium complex. Such oxidation products degrade the plating current efficiency and may affect plating quality adversely. Oxidation may continue to the +8 or $RuO_4$ state which has an appreciable vapor pressure and is poisonous. This problem has been attacked by adding a reducing agent, such as ammonium formate or ammonium sulphamate to the plating bath. However, these reducing agents, as well as the buffering materials used, often decrease the quality of the plating, possibly because of impurities plated with the ruthenium, and may prevent ruthenium plating entirely.

Ruthenium platings made in accordance with the described prior art are not satisfactory for many purposes because they tend to crack if the plating thickness exceeds 0.3 μm and is subjected to thermal shock such as that typically accompanying the sealing of reed switches.

SUMMARY OF THE INVENTION

It has been found that layers of ruthenium of improved resistance to thermal shock can be produced by electroplating from an aqueous solution of the ruthenium compound $[Ru_2N(H_2O)_2Cl_8]K_3$ prepared by a procedure differing from that described in U.S. Pat. No. 3,576,724. In particular, instead of the excess of sulphamic acid over ruthenium chloride which is used in the prior art, a molar ratio of sulphamic acid to ruthenium chloride in the vicinity of 0.5:1 is used in the initial reaction. The ammonium salt so produced is converted to the potassium salt by the addition of KCl and the potassium salt is precipitated in a pure form by the addition of HCl. Not only does the salt so produced lead to a better electroplated ruthenium, but the time required to produce the ammonium salt can be reduced by a factor of about 20 as compared to the prior art procedure. It can be postulated that the different electroplating results between the compound produced by the present process and the prior art compound results from as yet unidentified isomerization and/or polymerization products present in the material made by the prior art. The electroplating of the ruthenium is further enhanced by the use of appropriate buffering materials for the plating solution and by the use of a porous separator between the anode and cathode compartments to prevent oxidation of ruthenium at the anode.

DETAILED DESCRIPTION

The plating solution uses the nitrogen bridged compound $[Ru_2N(H_2O)_2Cl_8]K_3$ which is prepared by refluxing, in an aqueous solution, a mixture of sulphamic acid and ruthenium chloride which can conveniently be in the form of commercially available hydrated ruthenium chloride of approximately 40 percent ruthenium content and consisting predominantly of $(RuCl_3.3H_2O)$. The apparent structure of crystalline $[Ru_2N(H_2O)_2Cl_8]K_3$ is described in *Chemical Communications*, pp. 574–575 (1969). Isomers of this compound exist although it is believed that the structure described has the best plating properties. While the precise ratio of molar concentrations of ruthenium and sulphamic acid is not crucial, it has been found that the ratio should exceed, but by not more than 10 to 20 percent, the stoichiometric ratio of 2 moles of the ruthenium compound to 1 mole of sulphamic acid. Thus, the preferred range of molar ratios of sulphamic acid to ruthenium is from 0.55 to 0.60. Higher ratios, i.e., more sulphamic acid, result in an inferior quality plating solution apparently because polymerization extends the desired Ru-N-Ru structure. Lower ratios result in a lower yield of ruthenium. Refluxing for a period of two hours usually suffices to complete the reaction. Excess water may now be removed from the solution by, e.g., vacuum distillation. KCl, conveniently in solution, is then added and mixed for a brief period after which hydrochloric acid is added. The ruthenium compound $K_3[Ru_2N(H_2O)_2Cl_8]$ precipitates and may be recovered as a high purity solid after vacuum filtration. It has been found that an excess Cl concentration present in the refluxing stage causes production of undesired materials, e.g., isomers or substitution products of higher chlorine content.

It is thought that the compound forms through the following sequence. A sulphamic acid molecule replaces a chlorine atom in the $RuCl_3.3H_2O$ molecule and an intermediate nitrogen bridged complex forms when the same nitrogen atom replaces a chlorine atom in a second molecule with formation of HCl, $H_2O$ and $SO_2$. Excess HCl moves the reaction back and it is believed this, at least partially, explains the rapidity of applicants' process compared to the process of U.S. Pat. No. 3,576,724. The addition of KCl and HCl first replaces $H_2O$ groups with chloride anions and then precipitates the compound by the well-known salting out effect. Although the mechanism that produces undesired isomers is not known with certainty, it is hypothesized to be interchange of $H_2O$ groups and chloride anions in axial and equatorial positions. The addition of $H_2O$ in subsequent steps may cause any chloride anion to be removed with consequent formation of undesired products.

For plating, the compound is dissolved in water to a nominal concentration of 10 grams/liter of ruthenium and then buffered to a pH in the range from 1.3 to 3.0. A nominal pH of 1.7 obtained with a mixture of 0.75 molar phosphoric acid and 0.75 molar $NaH_2PO_4$ has been found to yield high quality ruthenium plating. The phosphate anion is not readily reduced and the problem of plating impurities, associated with the reduction of anions (including sulfate), that adversely affect the quality of the ruthenium plating is eliminated. Nominal values for the plating temperature and current density are 70° C and 10 mA/cm².

The quality of the ruthenium plating, in terms of resistance to cracking, can be further improved if use of a reducing agent, preventing formation of $Ru^{8+}$ at the anode, can be avoided. A membrane separating the anode and cathode compartments of the electroplating apparatus and not passing ruthenium atoms can keep the anode compartment free of ruthenium. The membrane must be able to withstand the high temperature and low pH of the plating solution for a long time period. A membrane made of a sulfonated fluorocarbon, such as NAFION, and desirably reinforced with TEFLON (polytetrafluoroethylene), keeps the anode compartment free of ruthenium as it does not pass ruthenium.

EXAMPLE

A mixture formed by combining 50 grams of commercially available technical grade hydrated ruthenium chloride dissolved in 750 ml of water and containing approximately 40 percent by weight of ruthenium and 12.5 grams of $NH_2SO_3H$ dissolved in 250 ml of water was refluxed for two hours and vacuum distilled to remove 750 ml of water. 165 ml of a 4 M KCl solution were added to the remaining liquid and mixed for five minutes. 1245 ml of 12 M HCl were then added and vigorously stirred for 30 minutes at a temperature of 50° C. The ruthenium compound $[Ru_2N(H_2O)_2Cl_8]K_3$ precipitated and was recovered as a high purity solid after removing the remaining liquid through filtration and vacuum drying the precipitate at 70° C. The yield of 64.5 grams was essentially 100 percent, by weight, of the starting material.

The plating solution was formed by dissolving 10 grams per liter of ruthenium from $[Ru_2N(H_2O)_2Cl_8]K_3$ prepared as described. The solution was buffered to a nominal pH of 1.7 by a 0.75 molar solution of phosphoric acid and a 0.75 molar solution of sodium dihydrogen phosphate. Articles, including reed switch reeds having their contact areas plated with a gold plate, were plated over the gold in the above ruthenium plating solution at 70° C with a current density of 10 mA/cm² and a plating efficiency of approximately 70 percent. A one micron ruthenium layer was plated in about 10 minutes. The anode compartment was kept free of ruthenium by a stable cation exchange membrane of NAFION separating the anode and cathode compartments. The ruthenium plating did not crack when the reed switches were sealed at temperatures between 400° and 550° C. The ruthenium plating did not crack when plated articles were inserted into an oven at 550° C for periods between 20 and 60 seconds and then withdrawn.

What is claimed is:

1. An article electrodeposited with ruthenium from an aqueous plating solution of the ruthenium compound $K_3[Ru_2N(H_2O)_2Cl_8]$ of the composition and structure resulting from the method comprising refluxing an aqueous solution of ruthenium chloride and $NH_2SO_3H$ said mixture having approximately 0.5 moles of sulphamic acid for each mole of ruthenium and precipitating said compound by adding KCl and HCl to said mixture.

2. An article as recited in claim 1 in which said aqueous plating solution further comprises buffering materials buffering said aqueous solution to a pH within the range from 1.3 to 3.0.

3. An article as recited in claim 2 in which said buffering materials comprise phosphoric acid and sodium dihydrogen phosphate.

4. A process of preparing a solution of $K_3[Ru_2N(H_2O)_2Cl_8]$ for the electrodeposition of ruthenium comprising the steps of refluxing a mixture of hydrated ruthenium chloride and $NH_2SO_3H$, said mixture having approximately 0.5 moles of sulphamic acid for each mole of ruthenium and precipitating said $K_3[Ru_2N(H_2O)_2Cl_8]$ by adding KCl and HCl to said mixture.

5. A method of electrodepositing an article with ruthenium comprising the steps of placing an aqueous solution of the compound prepared by the process of claim 4 into electroplating apparatus, said apparatus having anode and cathode compartments, and cathodically depositing ruthenium on said article.

6. The method of claim 5 comprising the further step of buffering said solution to a pH within the range from 1.3 to 3.0.

7. The method of claim 6 in which said buffering step uses a mixture of phosphoric acid and sodium dihydrogen phosphate.

8. The method of claim 5 wherein said anode compartment is maintained substantially free of ruthenium.

9. The method of claim 8 in which the anode compartment is maintaned substantially free of ruthenium by separating said anode compartment from the cathode compartment of said plating apparatus by means of a permeable membrane, said permeable membrane not passing ruthenium containing anions.

10. The method of claim 9 in which said permeable membrane consists essentially of a stable cation exchange membrane.

11. The article produced by the process of claim 5.

* * * * *